UNITED STATES PATENT OFFICE.

LOUIS S. LANGVILLE, OF TROY, NEW YORK.

CARBON PRODUCT.

SPECIFICATION forming part of Letters Patent No. 475,062, dated May 17, 1892.

Application filed September 26, 1891. Serial No. 406,930. (Specimens.)

*To all whom it may concern:*

Be it known that I, LOUIS S. LANGVILLE, of the city of Troy, county of Rensselaer, and State of New York, have invented a new and useful Carbon Product, of which the following is a specification.

My invention relates to a form of carbon as a new article of manufacture and as produced from the residuum of wood pulp manufacture where such residuum has been treated for the recarbonization and reclaiming of the alkali by which the wood cellulose has been treated to remove the silica and resins. This new form of carbon differs from that prepared from wood known as "charcoal," or from coal in which the silica remains, and it differs from that form of carbon made from resins and known as "lamp-black," or that form of the latter produced from the burning of gaseous hydrocarbon substances by its having greater density, and is thus better fitted to be condensed by pressure for electric-light carbons or other uses.

The residuum from which my new form of carbon is produced and heretofore treated as a waste product of wood-pulp manufacture (where an alkaline process is employed) results from the following procedure: Soda in the form of a carbonate in solution is treated with lime, the resulting action being that the lime is converted into and precipitated as an insoluble carbonate of lime, and the soda made caustic as a hydrate. Wood cut up into chips is placed in a digesting-vessel and heat and steam-pressure applied thereto, which has the effect of converting the silica which the wood contains into a silicate of soda, and to saponify the resins and gum-resins which the wood contains, which treatment is continued long enough to effect these results, when the liquor is drawn off from the wood-cellulose, and the treatment of the latter continued to complete its conversion into wood pulp. The liquor thus drawn from off the wood-cellulose contains some of the latter, the silicate of soda obtained from the action of the caustic soda upon the silica contained in the wood, and this liquid also contains the resinous substances that have been saponified by the caustic alkali and which were in the wood. This liquor is then condensed by evaporation and transferred to a carbonizing-furnace, wherein by the aid of heat, fire, and the carbonic-acid gas produced by the latter the soda hydrate is converted into a carbonate of soda or, as termed in the art, "recarbonized." After this treatment the carbonate of soda and silicate of soda are removed by leaching the residuum with water, the remaining material consisting of the carbonized wood-cellulose and carbonized resinous matter and a trace of the soda alkali. It is from this residuum that I prepare my new form of carbon by treating it with a weak solution of hydrochloric acid or sulphuric acid, which dissolves off the remaining trace of soda, after which the material is dried and powdered, the resulting product containing less than two per cent. of impurity.

This form of carbon thus produced from an ordinarily refuse material can be used for all the purposes for which lamp-black or like forms of carbon are employed. Thus it may be used as a pigment or for making electric-light carbons, or in the manufacture of gunpowder, or any other purpose where a carbon containing so little foreign material is applicable.

Having thus described my invention, what I claim, and desire to secure by Letters Patent, is—

As a new article of manufacture, a carbon product made from the wood-cellulose and resinoid residuum of wood-pulp manufacture, and in which the bulk of the silica of the wood-cellulose has been removed and the lighter carbon produced from the resinoids, combined with the denser carbon of the wood-cellulose, as and for the purposes set forth.

Signed at Troy, New York, this 7th day of September, 1891, and in the presence of the two witnesses whose names are hereto written.

LOUIS S. LANGVILLE.

Witnesses:
CHARLES S. BRINTNALL,
W. E. HAGAN.